(12) United States Patent
Morgan (10) Patent No.: US 12,031,633 B2
(45) Date of Patent: Jul. 9, 2024

(54) DUAL AXIS SEAT RETAINER

(71) Applicant: Parker-Hannifin Corporation, Cleveland, OH (US)

(72) Inventor: Daniel P. Morgan, Vacaville, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 18/044,310

(22) PCT Filed: Nov. 22, 2021

(86) PCT No.: PCT/US2021/060259
§ 371 (c)(1),
(2) Date: Mar. 7, 2023

(87) PCT Pub. No.: WO2022/115352
PCT Pub. Date: Jun. 2, 2022

(65) Prior Publication Data
US 2023/0358318 A1    Nov. 9, 2023

Related U.S. Application Data

(60) Provisional application No. 63/118,997, filed on Nov. 30, 2020.

(51) Int. Cl.
*F16K 1/42* (2006.01)
*F16K 7/12* (2006.01)
(Continued)

(52) U.S. Cl.
CPC ............. *F16K 1/427* (2013.01); *F16K 7/123* (2013.01); *F16K 7/14* (2013.01); *F16K 27/02* (2013.01)

(58) Field of Classification Search
CPC . F16K 1/427; F16K 7/123; F16K 7/14; F16K 27/02
(Continued)

(56) References Cited

U.S. PATENT DOCUMENTS 4,807,849 A    2/1989  Morgan
5,524,865 A *  6/1996  Uchisawa ................. F16K 7/14
                                                  251/359
(Continued)

FOREIGN PATENT DOCUMENTS

EP      0312500 A2    4/1989
WO  2010/129826 A2   11/2010
(Continued)

OTHER PUBLICATIONS

International Search Report and Written Opinion of the International Searching Authority for corresponding International Patent Application No. PCT/US2021/060259, mailed Mar. 14, 2022.

*Primary Examiner* — John Bastianelli
(74) *Attorney, Agent, or Firm* — Renner, Otto, Boisselle & Sklar, LLP (57) ABSTRACT

A valve assembly includes a valve body defining a valve passage and a valve seat disposed within the valve body. The valve assembly also includes a valve actuator moveable between a closed position in which the valve actuator is sealed against the valve seat to close the valve passage and an open position in which the valve actuator is spaced apart from the valve seat to open the valve passage. The valve assembly includes a valve seat retainer disposed within the valve body in contact with the valve seat. The valve seat retainer is configured to impart both an axial support force and a lateral support force on the valve seat to prevent extrusion of the valve seat when the valve actuator is sealed against the valve seat in the closed position.

9 Claims, 5 Drawing Sheets

(51) Int. Cl.
*F16K 7/14* (2006.01)
*F16K 27/02* (2006.01)

(58) Field of Classification Search
USPC .......................... 251/331, 335, 2, 359–365
See application file for complete search history.

(56) References Cited

U.S. PATENT DOCUMENTS

| | | | |
|---|---|---|---|
| 6,786,471 B2 * | 9/2004 | Nakata | F16K 7/16 |
| | | | 251/360 |
| 6,871,803 B1 * | 3/2005 | Ohmi | F16K 7/16 |
| | | | 239/596 |
| 6,911,891 B2 | 6/2005 | Qiu et al. | |
| 9,091,366 B2 | 7/2015 | Weyer, Jr. et al. | |
| 9,285,042 B2 * | 3/2016 | Kitano | F16K 7/14 |
| 9,719,599 B2 | 8/2017 | Kitano et al. | |
| 10,648,572 B2 | 5/2020 | Sawada et al. | |
| 2014/0326915 A1 | 11/2014 | Kitano et al. | |

FOREIGN PATENT DOCUMENTS

| | | |
|---|---|---|
| WO | 202026579 A1 | 2/2020 |
| WO | 2020/118174 A1 | 6/2020 |

\* cited by examiner

```
100
  ↓
┌─────────────────────────────────────┐
│ 102 removing a valve seat retainer  │
└─────────────────────────────────────┘
                  ↓
┌─────────────────────────────────────┐
│ 104 removing the used valve seat    │
└─────────────────────────────────────┘
                  ↓
┌─────────────────────────────────────┐
│ 106 inserting a new valve seat      │
└─────────────────────────────────────┘
                  ↓
┌─────────────────────────────────────┐
│ 108 inserting (replacing) the valve │
│ seat retainer                       │
└─────────────────────────────────────┘
```

FIG. 5

```
200
  ↓
┌───────────────────────────────────────────────────┐
│ 202 inserting a valve seat retainer into a valve body │
└───────────────────────────────────────────────────┘
                         ↓
┌───────────────────────────────────────────────────┐
│ 204 inserting a valve actuator into the valve body │
└───────────────────────────────────────────────────┘
                         ↓
┌───────────────────────────────────────────────────┐
│ 206 securing the valve actuator within the valve body │
└───────────────────────────────────────────────────┘
                         ↓
┌───────────────────────────────────────────────────┐
│ 208 applying an axial support force and a lateral │
│ support force on the valve seat                   │
└───────────────────────────────────────────────────┘
```

FIG. 6

DUAL AXIS SEAT RETAINER

RELATED APPLICATIONS

This application is a national phase of International Application No. PCT/US2021/060259 filed Nov. 22, 2021, which claims the benefit of U.S. Provisional Application No. 63/118,997 filed on Nov. 30, 2020, the contents of which are hereby incorporated herein by reference in their entireties.

FIELD OF INVENTION

The present application relates generally to valves, and more particularly to high purity valves used in semiconductor fabrication.

BACKGROUND OF THE INVENTION

There are numerous segments within the semiconductor industry with specific product needs. One such segment is high temperature vapor deposition. In such applications, process chemicals in liquid or solid form are heated to develop vapor pressure, and then the heated vapor is routed to a reaction chamber. It is important to maintain the high vapor temperature throughout the delivery to the reaction chamber so that the vapor does not condense. For example, current vapor deposition techniques may run at temperatures as high as 200° C. (293° F.), with a need to increase the operating temperature to 250° C. (482° F.) both for new chemistries and to increase pressure and therefore throughput of existing low vapor pressure materials. Materials used in the fabrication of such high purity valves include double remelted 3161 stainless steel, with the surfaces further refined through electropolishing to provide a chrome oxide rich layer that will resist corrosion from the various gases used in semiconductor fabrication.

High purity valves for operation at elevated temperatures require well-supported valve seats to prevent extrusion of the valve seat due to the closing force being applied. In typical designs, a metal body is crimped over soft valve seat material to retain the valve seat in place without extrusion. Specifically, a lip on the valve body is crimped or rolled over a ledge on the valve seat to constrain the valve seat. This design creates two problems for such high purity valves. First, the valve body material is displaced when crimping, thereby disrupting the material surface. For example, such crimping may break through the chrome oxide surface layer on the stainless steel, which leaves the valve body subject to corrosion at that location. Second, the valve seat cannot be readily removed and replaced in circumstances in which it is necessary or desirable to replace the valve seat. For example, in canister configurations often used for vapor deposition, when the chemical delivery canister is emptied, the canister and the attached delivery and purge valves are fully disassembled, cleaned, and rebuilt or altogether replaced. At least for canister valves, the valve seat typically is replaced at every canister fill cycle. The rebuilding and/or replacing of these valves is problematic when the valve seats are difficult or impossible to remove, such as valve seats attached by crimping, resulting in wasted time and scrap of expensive welded or crimped valve assemblies.

SUMMARY OF INVENTION

The valve disclosed herein solves problems caused by or associated with conventional crimped or welded valve seats. Instead of a crimped or welded valve seat, the valve configuration of the present disclosure includes a flexible dual axis valve seat retainer configured to secure a valve seat within a valve body such that the valve seat is laterally and axially supported to prevent movement of the valve seat under load (i.e., when sealed against by the valve actuator). The valve seat retainer is a flexible member configured to transmit a force constantly applied from the valve actuator when fully assembled into an axial force for holding the valve seat in place. At the same time, deflection of the valve seat retainer drives the valve seat retainer laterally inward against the valve seat, thereby transmitting a lateral force on the valve seat for laterally supporting the valve seat to prevent extrusion of the valve seat under load at elevated temperatures. The valve seat retainer includes a plurality of holes to allow for gas to flow through the valve seat retainer. Use of the valve seat retainer results in a well-supported valve seat that may be readily replaced while preventing surface damage and subsequent corrosion of the valve body surface material.

An aspect of the invention is a valve assembly including a valve body defining a valve passage, a valve seat disposed within the valve body, and a valve actuator moveable between a closed position in which the valve actuator is sealed against the valve seat to close the valve passage, and an open position in which the valve actuator is spaced apart from the valve seat to open the valve passage. The valve assembly also includes a valve seat retainer disposed within the valve body in contact with the valve seat and configured to impart both an axial support force and a lateral support force on the valve seat to prevent extrusion of the valve seat when the valve actuator is sealed against the valve seat in the closed position.

Another aspect of the invention is a method of replacing a used valve seat in a valve assembly including the steps of removing a valve seat retainer from the valve assembly, removing the used valve seat from the valve assembly, inserting a new valve seat into the valve assembly, and inserting a valve seat retainer back into the valve assembly in contact with the new valve seat such that the inserted valve seat retainer is configured to impart both an axial support force and a lateral support force on the new valve seat to prevent extrusion of the new valve seat when the valve actuator is sealed against the valve seat in the closed position.

Another aspect of the invention is a method of assembling a valve assembly including the steps of inserting a valve seat retainer into a valve body of the valve assembly such that an inner edge of the valve seat retainer contacts a valve seat within the valve assembly, and inserting a valve actuator into the valve body such that an outer edge of the valve actuator contacts an outer edge of the valve seat retainer. The method of assembling also includes the steps of securing the valve actuator within the valve body such than an axial loading force is imparted on the outer edge of the valve seat retainer, and imparting an axial support force and a lateral support force on the valve seat by the valve seat retainer.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Embodiments of the present application will now be described with reference to the drawings, wherein like reference numerals are used to refer to like elements throughout. It will be understood that the figures are not necessarily to scale.

Figure 1:
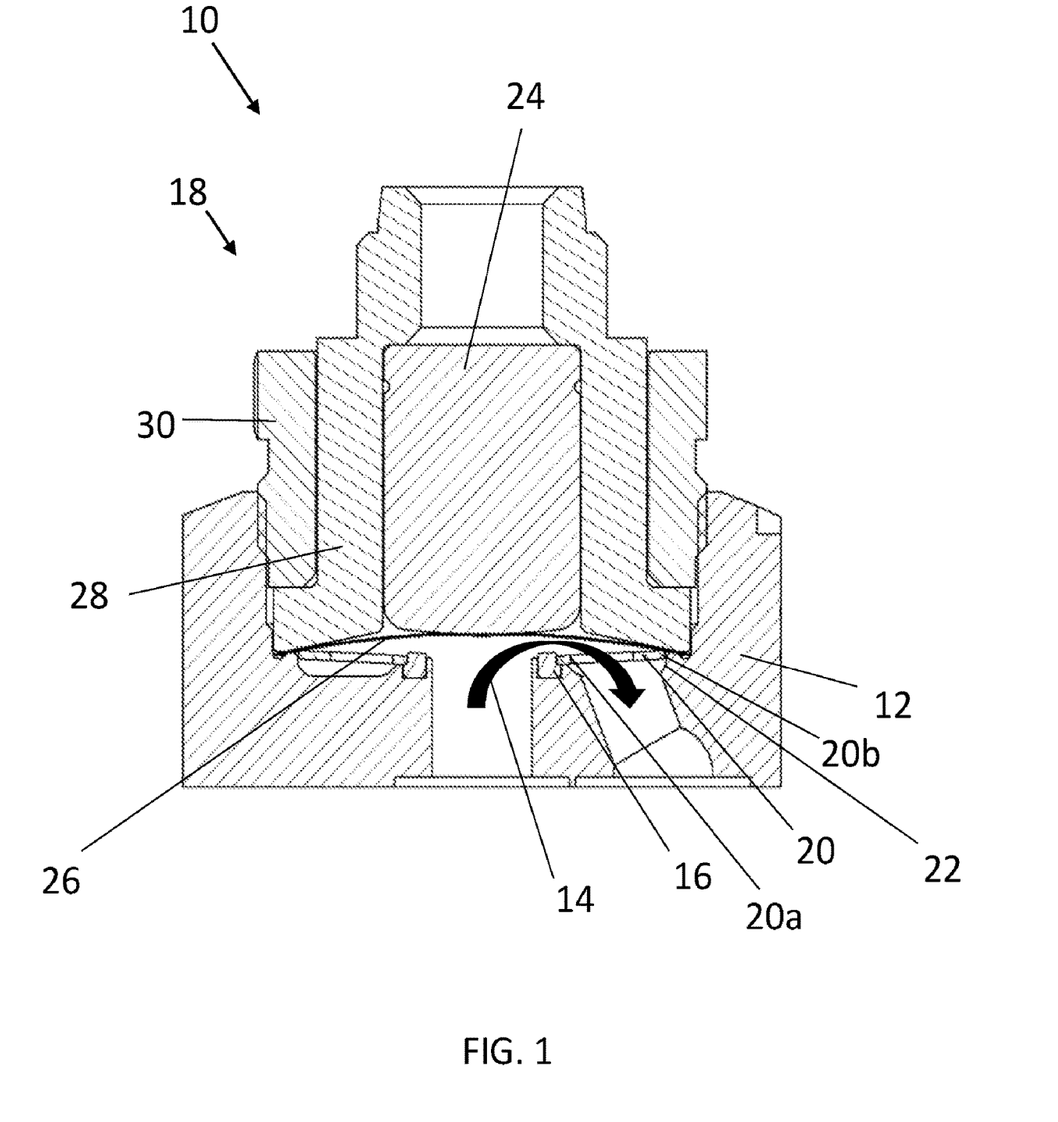
FIG. 1 is a cross sectional view of a valve assembly including a valve seat retainer.

FIG. 1 depicts a valve assembly 10 having a valve body 12 defining a valve passage 14, and a valve seat 16 disposed within the valve body 12. The valve passage 14 is configured to have a material flow therethrough, for example, along the direction of the arrow depicted in the valve passage 14, or in the reverse direction of the arrow. The valve assembly 10 includes a valve actuator 18 moveable between a closed position in which the valve actuator 18 is sealed against the valve seat 16 to close the valve passage 14 and prevent the material from flowing through the valve, and an open position in which the valve actuator 18 is spaced apart from the valve seat 16 to open the valve passage 14 and allow the material to flow through the valve. The valve assembly 10 also includes a dual-axis valve seat retainer 20 disposed within the valve body 12 in contact with the valve seat 16. The valve seat retainer 20 is flexible and supported within the valve assembly 10 to provide a well-supported valve seat 16 and prevent extrusion of the valve seat 16 when the valve actuator 18 is sealed against the valve seat 16 in the closed position. For example, the valve seat retainer 20 may be disposed within the valve body 12 in contact with the valve seat 16 on an inner edge 20a of the valve seat retainer, and in contact with the valve actuator 18 (for example, a diaphragm 26 of the valve actuator 18, described in more detail below) at an outer edge 20b of the valve seat retainer such that the flexible valve seat retainer 20 is deflected under load within the valve assembly 10. In this manner, the dual-axis valve seat retainer 20 is configured to impart both an axial support force and a lateral support force on the valve seat 16.

In the embodiment depicted in FIG. 1, the valve actuator 18 includes a piston 24 and a diaphragm 26. The piston 24 may be linearly moveable between a first position and a second position. As the piston 24 moves between the first position and the second position, the piston 24 moves the diaphragm 26 between an unsealed position and a sealed position, respectively. Specifically, in the open position of the valve actuator 18, the piston 24 of the valve actuator 18 is in the first position and the diaphragm 26 is in the unsealed position (lifted off of the valve seat 16). In the closed position of the valve actuator 18, the piston 24 is in the second position and the diaphragm 26 is in the sealed position (sealed against the valve seat 16). As depicted in FIG. 1, the diaphragm 26 is biased in the unsealed position in which the diaphragm is spaced apart from the valve seat 16 such that the valve passage 14 is open for material to flow through the valve. The diaphragm 26 is moveable by the piston 24 from the unsealed position to the sealed position in which the diaphragm seals against the valve seat 16 to close the valve passage 14 and prevent the material from flowing through the valve. In the sealed position, the diaphragm 26 is configured to contour to the shape of the valve seat 16 to form a compliant seal between the diaphragm and the valve seat.

The valve actuator 18 may include a cap 28 disposed over and around the piston 24 and a nut 30 configured to secure the piston 24, diaphragm 26, and cap 28 within the valve assembly 10. The valve actuator 18, including the piston 24, diaphragm 26, cap 28 and nut 30 is described as a non-limiting example and it is understood that other types of valve actuators may be applicable to the valve assembly 10 described herein.

During assembly, the nut 30 engages with the valve body 12 to secure the valve actuator. For example, the nut 30 may have a threaded portion configured to engage and secure with a corresponding threaded portion of the valve body 12. As the nut 30 is engaged within the valve body 12, the nut 30 imparts an axial loading force on the outer edge of the cap 28 and diaphragm 16, driving the cap 28 and diaphragm 16 against the outer edge 20b of the valve seat retainer 20. Accordingly, the valve actuator 18, specifically the diaphragm 26 via the cap 28 and the nut 30, imparts the axial loading force on the outer edge 20b of the valve seat retainer 20, causing the valve seat retainer to deflect and translate to impart an axial support force and a lateral support force to the valve seat 16. Once the valve assembly 10 is fully assembled and the nut 30 is fully engaged and secured with the valve body 12, the axial loading force, axial support force and lateral support force remain constant throughout operation of the valve assembly 10 as the piston 24 of the valve actuator 18 moves between the open position and the closed position.

Figure 2:
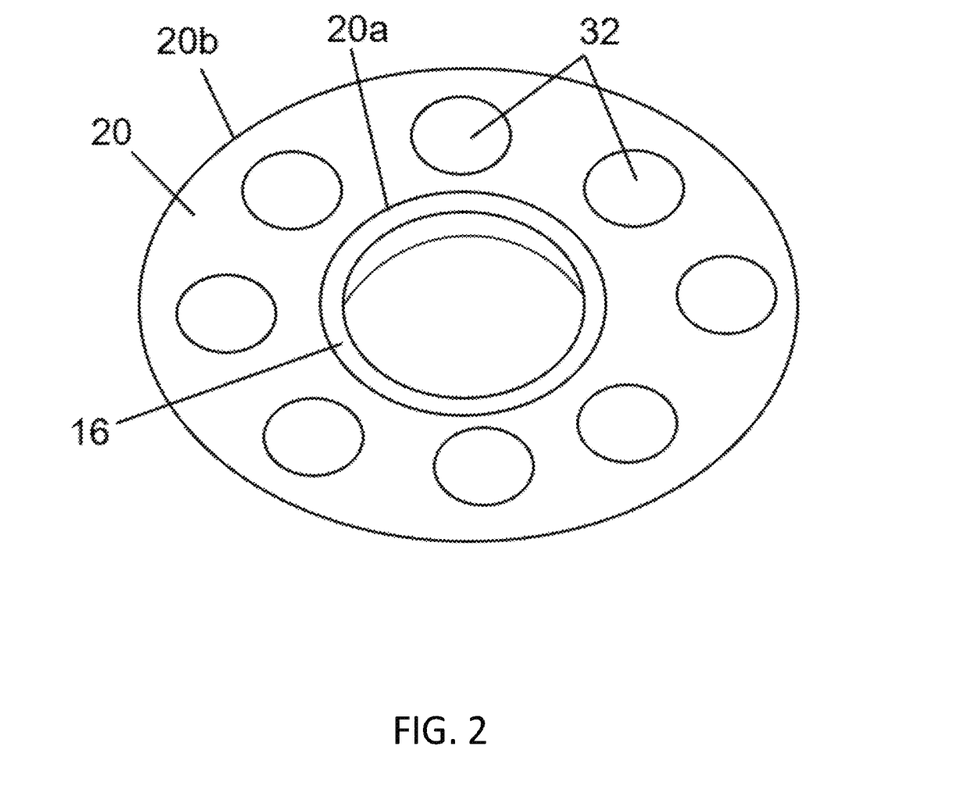
FIG. 2 is a perspective view of the valve seat retainer and valve seat used in the valve assembly of FIG. 1.

Turning to FIG. 2, the valve seat retainer 20 and the valve seat 16 are depicted together in isolation from the rest of the valve assembly 10 for further description. As depicted, the valve seat retainer 20 includes a plurality of holes 32 arranged between the outer edge 20b and the inner edge 20a of the valve seat retainer 20 to allow passage of the material through the valve seat retainer 20 such that the material can flow through the valve passage 14 when the valve actuator 18 is in the open position. The valve seat retainer 20 may be made of, for example, Elgiloy. The valve seat 16 may be made of, for example, Teflon or Perfluoroalkoxy alkane (PFA). The valve seat retainer 20 and the valve seat 16 may be, for example, annular.

Figure 3A:
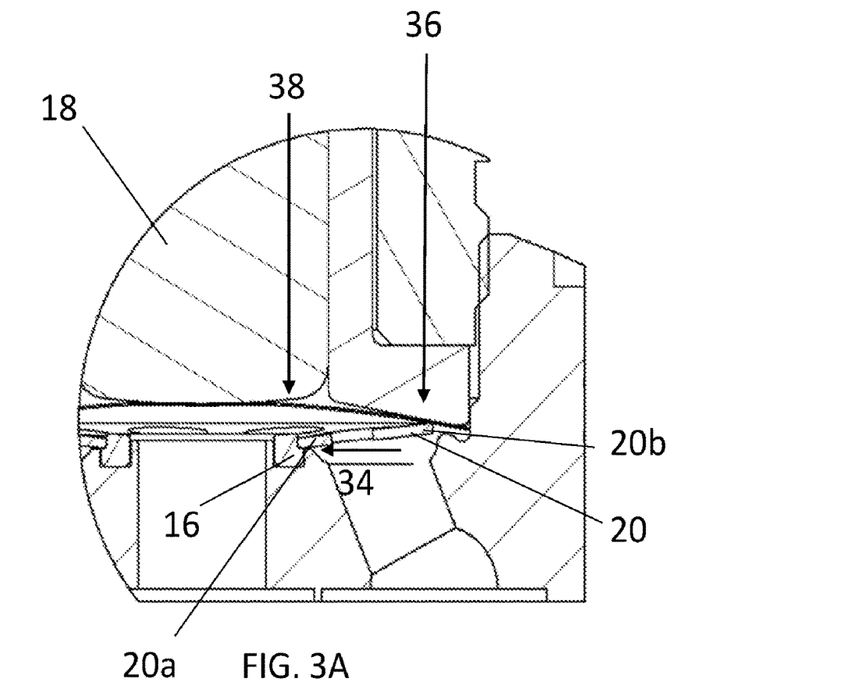
FIG. 3A is a cross sectional view of the valve assembly of FIG. 1 in a partially assembled state.
Figure 3B:
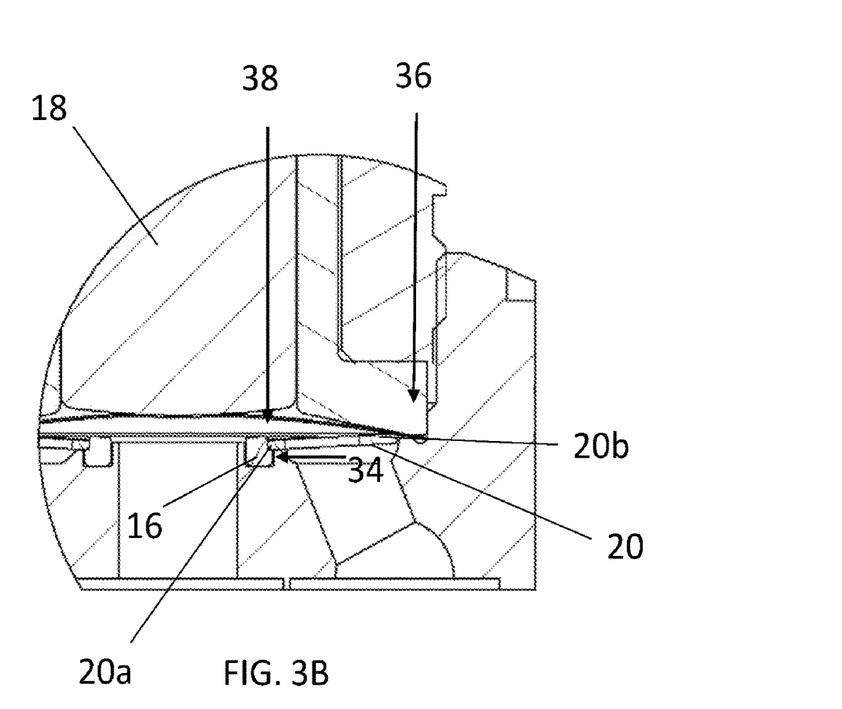
FIG. 3B is a cross sectional view of the valve assembly of FIG. 1 in a fully assembled state and in an open position.

The valve seat retainer 20 is configured to extend from the inner edge 20a to the outer edge 20b at an angle such that the valve seat retainer 20 may deflect when loaded into the valve assembly 10 and impart the axial support force and the lateral support force on the valve seat 16. Specifically, with reference to FIG. 3A, during assembly of the valve seat assembly 18, the valve seat 16 is inserted into the valve body 12 such that the inner edge 20a of the valve seat retainer 20 contacts the valve seat 16 and the outer edge 20b of the valve seat retainer 20 extends from the valve seat 16 at the angle toward the valve actuator 18. FIG. 3A depicts the valve seat retainer 20 in the valve assembly 10 in a partially assembled state, before the nut 30 of the valve actuator 18 is fully engaged and secured with the valve body 12 and before the valve actuator 18 imparts the axial loading force on the outer edge 20b of the valve seat retainer 20. With reference to FIG. 3B, after the valve actuator 18 is inserted and the nut 30 is fully engaged and secured with the valve body 12, the valve actuator 18, specifically the diaphragm 26 via the cap 28 and the nut 30, imparts the axial loading force 36 on the outer edge 20b of the valve seat retainer 20 such that the valve seat retainer 20 is deflected and imparts the axial support force 38 and the lateral support force 34 on the valve seat 16. Therefore, when the valve actuator 18 is moved from the open position to the closed position, the valve seat 16 is prevented from extruding.

Figure 4:
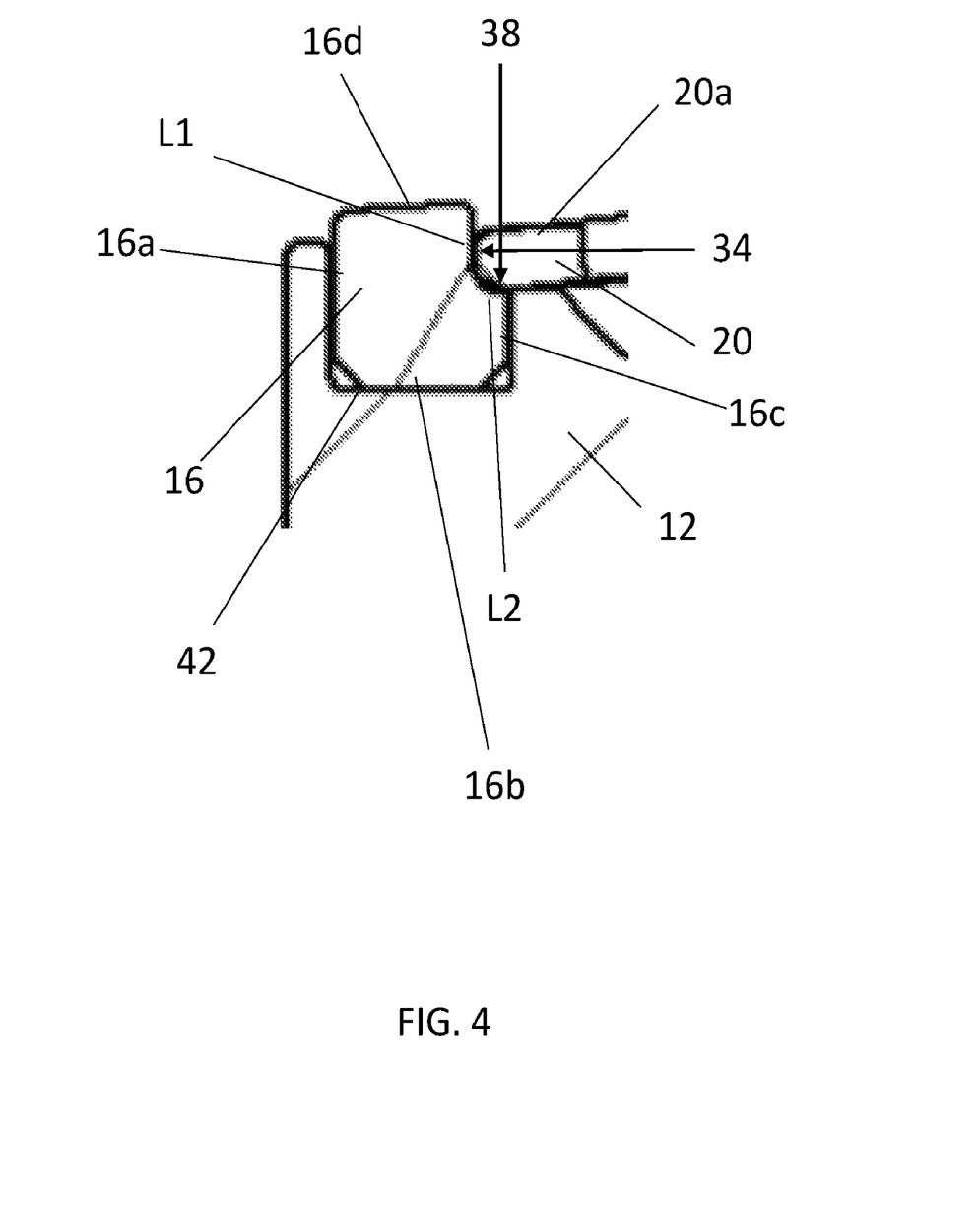
FIG. 4 is a cross sectional and close-up view of the valve assembly of FIGS. 1, 3, and 4, illustrating additional details associated with the valve seat and valve seat retainer.

Specifically, with reference to FIG. 4, the valve seat 16 is configured to fit at least partially within a notch 42 of the valve body 12 such that the valve seat 16 is supported at least partially at an inner surface 16a, a bottom surface 16b, and an outer surface 16c of the valve seat 16. The valve seat 16 may, however, protrude beyond the notch 42 of the valve body 12 on an upper surface 16d of the valve seat 16 so that the valve actuator 18 may seal against the valve seat 16 on the upper surface 16d of the valve seat 16 when the valve actuator 18 is in the closed position. Without the valve seat retainer 20, the upper surface 16d of the valve seat 16 may extrude laterally in an outward direction (to the right in FIG. 4) from the notch 42 when the valve actuator 18 is moved from the open position to the closed position and seals against the upper surface 16d of the valve seat 16. The valve seat retainer 20 is configured to contact the outer surface 16c of the valve seat 16 to provide the lateral support force 34 to prevent such extrusion. As described above, the valve seat retainer 20 is also configured to impart the axial support force 38 on the valve seat 16. That is, the outer surface 16c of the valve seat 16 may have an L-shaped cross-section, as depicted in FIG. 4, and the inner edge 20a of the valve seat retainer 20 contacts both legs of the L in the L-shaped cross section. In this manner, the inner edge 20a of the valve seat retainer 20 is configured to simultaneously impart the lateral support force 40 on a first leg L1 of the L of the L-shaped cross-section, and impart the axial support force 38 on a second leg L2 of the L of the L-shaped cross section, thereby securing and supporting the valve seat 16 within the notch 42 in both the axial and lateral directions when the valve actuator 18 moves from the open position to the closed position and seals against the upper surface 16d of the valve seat 16.

Figure 5:
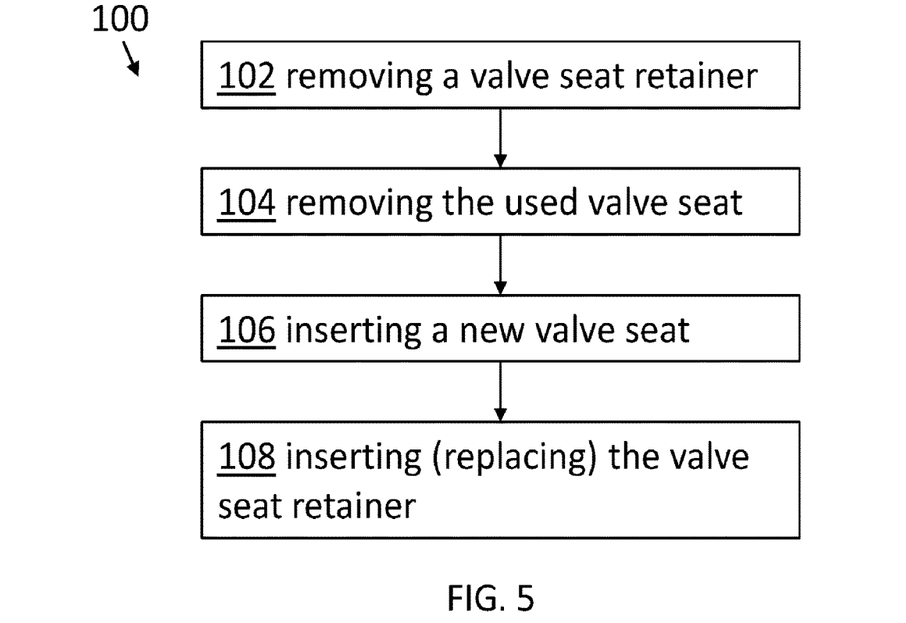
FIG. 5 is a flowchart of a method of replacing a used valve seat in a valve assembly.

With reference to FIG. 5, a method 100 of replacing a used valve seat in a valve assembly will be described. The valve assembly used in the method 100 may be the same as the valve assembly 10 previously described. The method 100 includes the steps of removing 102 a valve seat retainer (such as the valve seat retainer 20) from the valve assembly and removing 104 the used valve seat from the valve assembly. The method 100 may then include inserting 106 a new valve seat into the valve assembly and inserting 108 the valve seat retainer (or replacing with a new valve seat retainer) back into the valve assembly. Just as previously described with respect to the valve seat retainer 20, the valve seat retainer is inserted or replaced in contact with the new valve seat such that the valve seat retainer is configured to impart both an axial support force and a lateral support force on the new valve seat when the valve actuator moves from an open position to a closed position to prevent extrusion of the new valve seat when the valve actuator is sealed against the valve seat in the closed position. Specifically, the step of inserting or replacing 108 the valve seat retainer may include disposing an outer edge of the valve seat retainer between the valve actuator and the valve body of the valve assembly and contacting an inner edge of the valve seat retainer against the valve seat.

Figure 6:
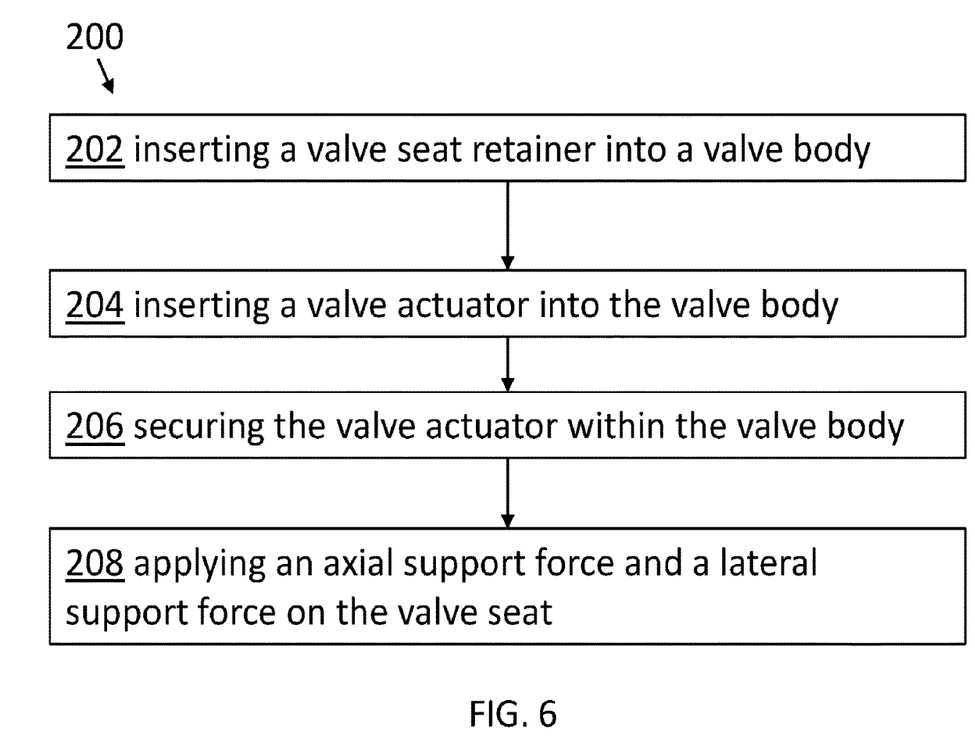
FIG. 6 is a flowchart of a method of assembling a valve assembly.

With reference to FIG. 6, a method 200 of assembling a valve assembly, such as the valve assembly 10 described herein, will be described. The method 200 includes a step 202 of inserting a valve seat retainer into a valve body of the valve assembly such that an inner edge of the valve seat retainer contacts a valve seat within the valve assembly. The method 200 then includes a step 204 of inserting a valve actuator into the valve body such that the valve actuator contacts an outer edge of the valve seat retainer. The valve actuator may include a piston and a diaphragm, such as the piston 24 and the diaphragm 26 described above with reference to the valve actuator 18 in FIG. 1. The step 204 of inserting the valve actuator may include, therefore, inserting the piston and the diaphragm such that an outer edge of the diaphragm contacts the outer edge of the valve seat retainer.

The method 200 then includes a step 206 of securing the valve actuator within the valve body such than an axial loading force is applied to the outer edge of the valve seat retainer and the valve seat retainer deflects to apply an axial support force and a lateral support force on the valve seat. For example, the valve actuator may additionally include a cap, such as the cap 28 described above with reference to valve actuator 18 of FIG. 1. The step 206 of securing the valve actuator may therefore include disposing a nut on the cap, such as the nut 30 described above with reference to FIG. 1, and engaging the nut with the valve body to secure the valve actuator. For example, the nut may have a threaded portion configured to engage and secure with a corresponding threaded portion of the valve body. As the nut is engaged with the valve body, the nut imparts an axial loading force on the outer edge of the cap and diaphragm, driving the cap and the diaphragm against the outer edge of the valve seat retainer. Accordingly, the valve actuator, specifically the diaphragm via the cap and the nut, imparts the axial loading force on the outer edge of the valve seat retainer, causing the valve seat retainer to deflect and translate to impart the axial support force and the lateral support force to the valve seat as described above. Accordingly, the method 200 further includes a step 208 of applying the axial support force and the lateral support force on the valve seat.

A valve assembly includes a valve body defining a valve passage, a valve seat disposed within the valve body, and a valve actuator moveable between a closed position in which the valve actuator is sealed against the valve seat to close the valve passage, and an open position in which the valve actuator is spaced apart from the valve seat to open the valve passage. The valve assembly also includes a valve seat retainer disposed within the valve body in contact with the valve seat and configured to impart both an axial support force and a lateral support force on the valve seat to prevent extrusion of the valve seat when the valve actuator is sealed against the valve seat in the closed position.

The valve seat retainer may include an outer edge disposed between the valve actuator and the valve body, and an inner edge in contact with the valve seat.

The valve seat retainer may be flexible and may be deflected under load within the valve assembly to impart the axial support force and the lateral support force on the valve seat.

The valve seat retainer may be configured to extend from the inner edge to the outer edge at an angle.

The valve seat retainer may include a plurality of holes arranged between the outer edge and the inner edge to allow passage of a material through the valve passage when the valve actuator is in the open position.

The valve actuator may include a piston and a diaphragm moveable by the piston between a sealed position in which the diaphragm seals against the valve seat to close the valve passage, and an unsealed position in which the diaphragm is spaced apart from the valve seat to open the valve passage.

The valve actuator further may include a cap disposed over the piston, and the valve assembly may include a nut disposed over the cap and configured to engage with the valve body to secure the valve actuator within the valve body.

The valve seat may be made of Teflon.

The valve seat retainer may be made of Elgiloy.

The valve seat and the valve seat retainer may be annular.

A method of replacing a used valve seat in a valve assembly includes the steps of removing a valve seat retainer from the valve assembly, removing the used valve seat from the valve assembly, inserting a new valve seat into the valve assembly, and inserting a valve seat retainer back into the valve assembly in contact with the new valve seat such that the inserted valve seat retainer is configured to impart both an axial support force and a lateral support force on the new valve seat to prevent extrusion of the new valve seat when the valve actuator is sealed against the valve seat in the closed position.

The step of inserting the valve seat retainer may include disposing an outer edge of the inserted valve seat retainer between the valve actuator and the valve body, and contacting an inner edge of the inserted valve seat retainer against the valve seat.

The removed valve seat retainer and the inserted valve seat retainer may be a same valve seat retainer.

A method of assembling a valve assembly includes the steps of inserting a valve seat retainer into a valve body of the valve assembly such that an inner edge of the valve seat retainer contacts a valve seat within the valve assembly, and inserting a valve actuator into the valve body such that an outer edge of the valve actuator contacts an outer edge of the valve seat retainer. The method of assembling also includes the steps of securing the valve actuator within the valve body such than an axial loading force is imparted on the outer edge of the valve seat retainer, and imparting an axial support force and a lateral support force on the valve seat by the valve seat retainer.

The step of inserting the valve actuator may include inserting a piston and a diaphragm of the valve actuator into the valve body such that an outer edge of the diaphragm contacts the outer edge of the valve seat retainer.

The step of securing the valve actuator within the valve body may include disposing a nut on a cap of the valve actuator and engaging the nut with the valve body such that the nut imparts the axial loading force on the outer edge of the valve actuator and on the outer edge of the valve seat retainer.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve assembly comprising:
   a valve body defining a valve passage;
   a valve seat disposed within the valve body;
   a valve actuator moveable between a closed position in which the valve actuator is sealed against the valve seat to close the valve passage, and an open position in which the valve actuator is spaced apart from the valve seat to open the valve passage; and
   a valve seat retainer disposed within the valve body in contact with the valve seat and configured to impart both an axial support force and a lateral support force on the valve seat to prevent extrusion of the valve seat when the valve actuator is sealed against the valve seat in the closed position;
   wherein the valve actuator includes:
   a piston; and
   a diaphragm moveable by the piston between a sealed position in which the diaphragm seals against the valve seat to close the valve passage, and an unsealed position in which the diaphragm is spaced apart from the valve seat to open the valve passage.

2. The valve assembly according to claim 1, wherein the valve seat retainer includes:
   an outer edge disposed between the valve actuator and the valve body; and
   an inner edge in contact with the valve seat.

3. The valve assembly according to claim 2, wherein the valve seat retainer includes a plurality of holes arranged between the outer edge and the inner edge to allow passage of a material through the valve passage when the valve actuator is in the open position.

4. The valve assembly according to claim 1, wherein the valve seat retainer is flexible and is deflected under load within the valve assembly to impart the axial support force and the lateral support force on the valve seat.

5. The valve assembly according to claim 4, wherein the valve seat retainer is configured to extend from the inner edge to the outer edge at an angle.

6. The valve assembly according to claim 1, wherein the valve actuator further includes a cap disposed over the piston, and the valve assembly further includes a nut disposed over the cap and configured to engage with the valve body to secure the valve actuator within the valve body.

7. The valve assembly according to claim 1, wherein the valve seat is made of Teflon.

8. The valve assembly according to claim 1, wherein the valve seat retainer is made of Elgiloy.

9. The valve assembly according to claim 1, wherein the valve seat and the valve seat retainer are annular.

* * * * *